United States Patent
Athreya et al.

(10) Patent No.: US 8,122,120 B1
(45) Date of Patent: Feb. 21, 2012

(54) FAILOVER AND FAILBACK USING A UNIVERSAL MULTI-PATH DRIVER FOR STORAGE DEVICES

(75) Inventors: Giridhar Athreya, Lake Forest, CA (US); Chris B. Legg, Oceanside, CA (US); Juan Carlos Ortiz, San Diego, CA (US)

(73) Assignee: Unisys Corporation, Blue Bell, PA (US)

( * ) Notice: Subject to any disclaimer, the term of this patent is extended or adjusted under 35 U.S.C. 154(b) by 2462 days.

(21) Appl. No.: 10/320,962

(22) Filed: Dec. 16, 2002

(51) Int. Cl.
*G06F 15/173* (2006.01)

(52) U.S. Cl. ........ 709/224; 709/225; 709/226; 709/227; 709/239; 714/2; 714/4; 714/5; 714/7; 714/8; 714/12; 714/18; 714/26; 714/43; 370/230; 370/238

(58) Field of Classification Search .............. 714/2, 4, 714/5, 26, 7, 12, 8, 18, 43; 709/239, 224–227; 370/230, 238
See application file for complete search history.

(56) References Cited

U.S. PATENT DOCUMENTS

| | | | | |
|---|---|---|---|---|
| 5,031,110 A * | 7/1991 | Yocom | ............................ | 702/33 |
| 5,987,621 A * | 11/1999 | Duso et al. | ........................ | 714/4 |
| 6,106,575 A * | 8/2000 | Hardwick | ..................... | 717/119 |
| 6,212,617 B1 * | 4/2001 | Hardwick | .......................... | 712/3 |
| 6,243,825 B1 * | 6/2001 | Gamache et al. | ................. | 714/4 |
| 6,298,451 B1 * | 10/2001 | Lin | .................................. | 714/4 |
| 6,341,356 B1 * | 1/2002 | Johnson et al. | .................... | 714/4 |
| 6,393,483 B1 * | 5/2002 | Latif et al. | ..................... | 709/226 |
| 6,636,239 B1 * | 10/2003 | Arquie et al. | ................. | 715/736 |
| 6,701,449 B1 * | 3/2004 | Davis et al. | ........................ | 714/4 |
| 6,741,561 B1 * | 5/2004 | Lee | ................ | 370/230 |
| 6,769,071 B1 * | 7/2004 | Cheng et al. | ...................... | 714/4 |
| 6,802,021 B1 * | 10/2004 | Cheng et al. | ...................... | 714/4 |
| 6,823,477 B1 * | 11/2004 | Cheng et al. | ..................... | 714/26 |
| 6,826,148 B1 * | 11/2004 | Lee | ................ | 370/230 |
| 6,857,026 B1 * | 2/2005 | Cain | ............................. | 709/239 |
| 6,883,108 B2 * | 4/2005 | Lee et al. | ......................... | 714/4 |
| 6,909,695 B2 * | 6/2005 | Lee et al. | ...................... | 370/238 |
| 6,925,056 B1 * | 8/2005 | Lee | ................ | 370/230 |
| 6,944,786 B2 * | 9/2005 | Kashyap | .......................... | 714/4 |
| 6,944,788 B2 * | 9/2005 | Dinker et al. | ..................... | 714/4 |
| 6,952,792 B2 * | 10/2005 | Emberty et al. | .................. | 714/5 |
| 7,003,687 B2 * | 2/2006 | Matsunami et al. | ............. | 714/4 |
| 7,007,189 B2 * | 2/2006 | Lee et al. | ........................... | 714/4 |
| 2003/0005119 A1 * | 1/2003 | Mercier et al. | ................. | 709/225 |
| 2003/0005350 A1 * | 1/2003 | Koning et al. | .................... | 714/4 |
| 2003/0172331 A1 * | 9/2003 | Cherian et al. | ................ | 714/712 |
| 2003/0182504 A1 * | 9/2003 | Nielsen et al. | ................ | 711/114 |
| 2003/0200477 A1 * | 10/2003 | Ayres | ............................... | 714/2 |

* cited by examiner

*Primary Examiner* — John Follansbee
*Assistant Examiner* — Saket K Daftuar
(74) *Attorney, Agent, or Firm* — Richard J. Gregson; Phuong-Quan Hoang

(57) ABSTRACT

An embodiment of the invention is a technique to manage failover and failback. A failover of a first path is detected. The first path corresponds to a first device in a plurality of physical devices having M device types. A connection status of the first device is determined if the failover is detected. The connection status is one of a connected status and a disconnected status. The disconnected status corresponds to the failover. The first path is adjusted according to the connection status.

30 Claims, 10 Drawing Sheets

FAILOVER AND FAILBACK USING A UNIVERSAL MULTI-PATH DRIVER FOR STORAGE DEVICES

CROSS REFERENCE TO RELATED APPLICATIONS

This application is related to the following patent applications: Ser. No. 10/321,029 entitled "UNIVERSAL MULTI-PATH DRIVER FOR STORAGE DEVICES"; Ser. No. 10/320,963 entitled "LOAD BALANCING IN A UNIVERSAL MULTI-PATH DRIVER FOR STORAGE DEVICES", all filed on the same date and assigned to the same assignee as the present application, the contents of each of which are herein incorporated by reference.

BACKGROUND

1. Field of the Invention

Embodiments of the invention relates to the field of storage systems, and more specifically, to driver for storage system.

2. Description of Related Art

Storage technology has become important for many data intensive applications. Currently, there are various storage devices having different capacities and streaming rates to accommodate various applications. Examples of these storage devices include redundant array of independent disks (RAIDs), tape drives, disk drives, and tape libraries. Techniques to interface to these devices include direct-attached storage, and storage area networks (SANs).

Existing techniques to interface to these storage devices have a number of drawbacks. First, they do not provide management to different types of devices in a same driver. A system typically has to install several different types of drivers, one for each type of storage device. This creates complexity in management and system administration, increases cost in software acquisition and maintenance, and reduces system reliability and re-configurability. Second, they do not provide failover among different storage devices, reducing system fault-tolerance and increasing server downtime. Third, they do not provide load balancing among different storage devices, causing performance degradation when there is skew in storage utilization.

SUMMARY OF THE INVENTION

An embodiment of the invention is a technique to manage failover and failback. A failover of a first path is detected. The first path corresponds to a first device in a plurality of physical devices having M device types. A connection status of the first device is determined if the failover is detected. The connection status is one of a connected status and a disconnected status. The disconnected status corresponds to the failover. The first path is adjusted according to the connection status.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to manage failover and failback. A failover of a first path is detected. The first path corresponds to a first device in a plurality of physical devices having M device types. A connection status of the first device is determined if the failover is detected. The connection status is one of a connected status and a disconnected status. The disconnected status corresponds to the failover. The first path is adjusted according to the connection status.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
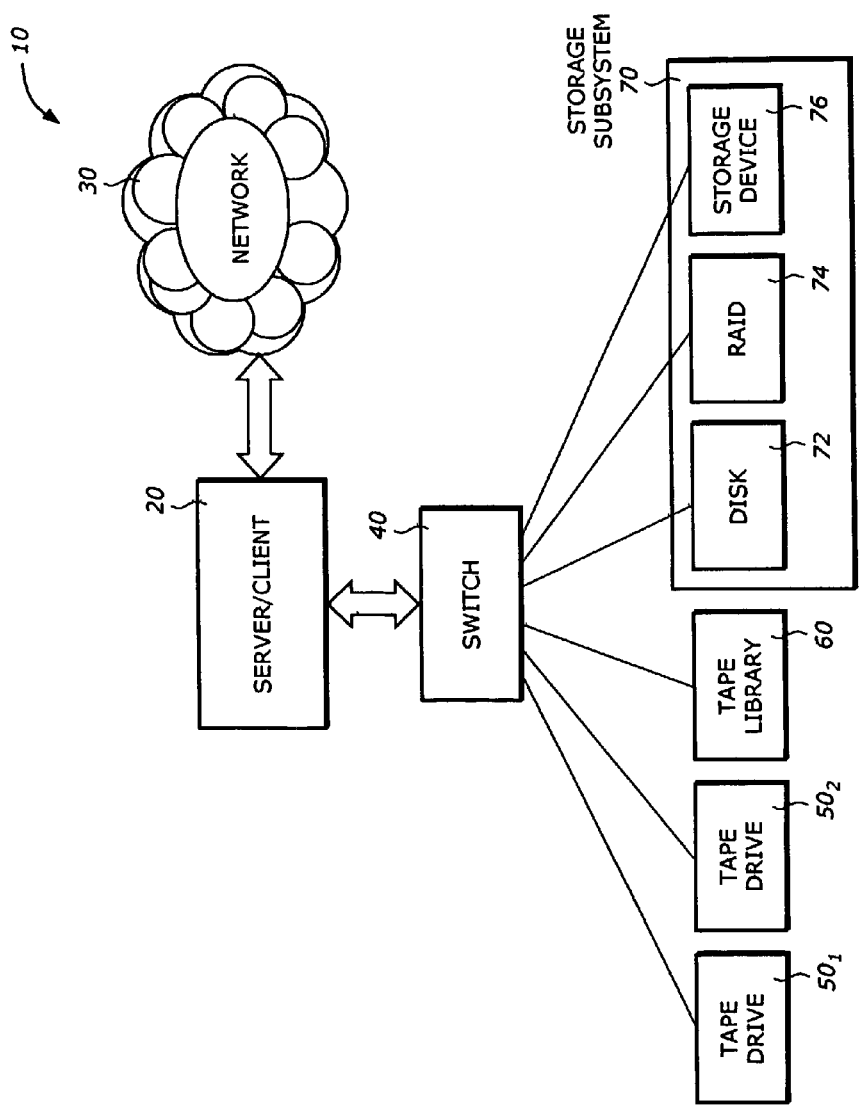
FIG. 1A is a diagram illustrating a system in which one embodiment of the invention can be practiced.

FIG. 1A is a diagram illustrating a system 10 in which one embodiment of the invention can be practiced. The system 10 includes a server/client 20, a network 30, a switch 40, tape drives $50_1$ and $50_2$, a tape library 60, and a storage subsystem 70. Note that the system 10 is shown for illustrative purposes only. The system 10 may contain more or less components as show. The system 10 may be used in a direct attached storage or storage area networks (SAN). The topology of the system 10 may be arbitrated loop or switched fabric.

The server/client 20 is a computer system typically used in an enterprise environment. It may be a server that performs dedicated functions such as a Web server, an electronic mail (e-mail) server, or a client in a networked environment with connection to other clients or servers. The server/client 20 usually requires large storage capacity for its computing needs. It may be used in a wide variety of applications such as finance, scientific researches, multimedia, academic and government work, databases, entertainment, etc.

The network 30 is any network that connects the server/client 20 to other servers/clients or systems. The network 30 may be a local area network (LAN), a wide area network (WAN), an intranet, an Internet, or any other types of network. The network 30 may contain a number of network devices (not shown) such as gateways, adapters, routers, etc. to interface to a number of telecommunication networks such as Asynchronous Transfer Mode (ATM) or Synchronous Optical Network (SONET).

The switch 40 is an interconnecting device that interconnects the server/client 20 to various storage devices or other devices or subsystems. The switch 40 may be a hub, a switching hub, a multiple point-to-point switch, or a director, etc. It typically has a large number of ports ranging from a few ports to hundreds of ports. The complexity may range from a simple arbitrated loop to highly available point-to-point. The throughput of the switch 40 may range from 200 MegaByte per second (MBps) to 1 GBytes per second (GBps).

The tape drives $50_1$ and $50_2$ are storage devices with high capacity for backup and archival tasks. The capacity for a tape used in the tape drives may range from tens to hundreds of Gigabytes (GB). The transfer rates may range from 10 to 50 MBps. The tape library 60 includes multiple tape drives with automated tape loading. The capacity of the tape library 60 may range from 1 to 1,000 Terabytes (TB) with an aggregate data rate of 50-300 MBps. The tape drives $50_1$ and $50_2$ and tape library 60 use sequential accesses. The storage subsystem 70 includes a disk subsystem 72, a redundant array of inexpensive disks (RAID) subsystem 74, and a storage device 76. The disk subsystem 72 may be a single drive or an array of disks. The RAID subsystem 74 is an array of disks with additional complexity and features to increases manageability, performance, capacity, reliability, and availability. The storage device 76 may be any other storage systems including magnetic, optic, electro-optics, etc.

The tape drives $50_1$ and $50_2$, tape library 60, disk subsystem 72, redundant array of inexpensive disks (RAID) subsystem 74, and storage device 76 form physical devices that are attached to the server/client 20 to provide archival storage. These devices typically include different device types. The server/client 20 has ability to interface to all of these device types (e.g., tape drives, tape library, disk RAID) in multiple paths.

Figure 1B:
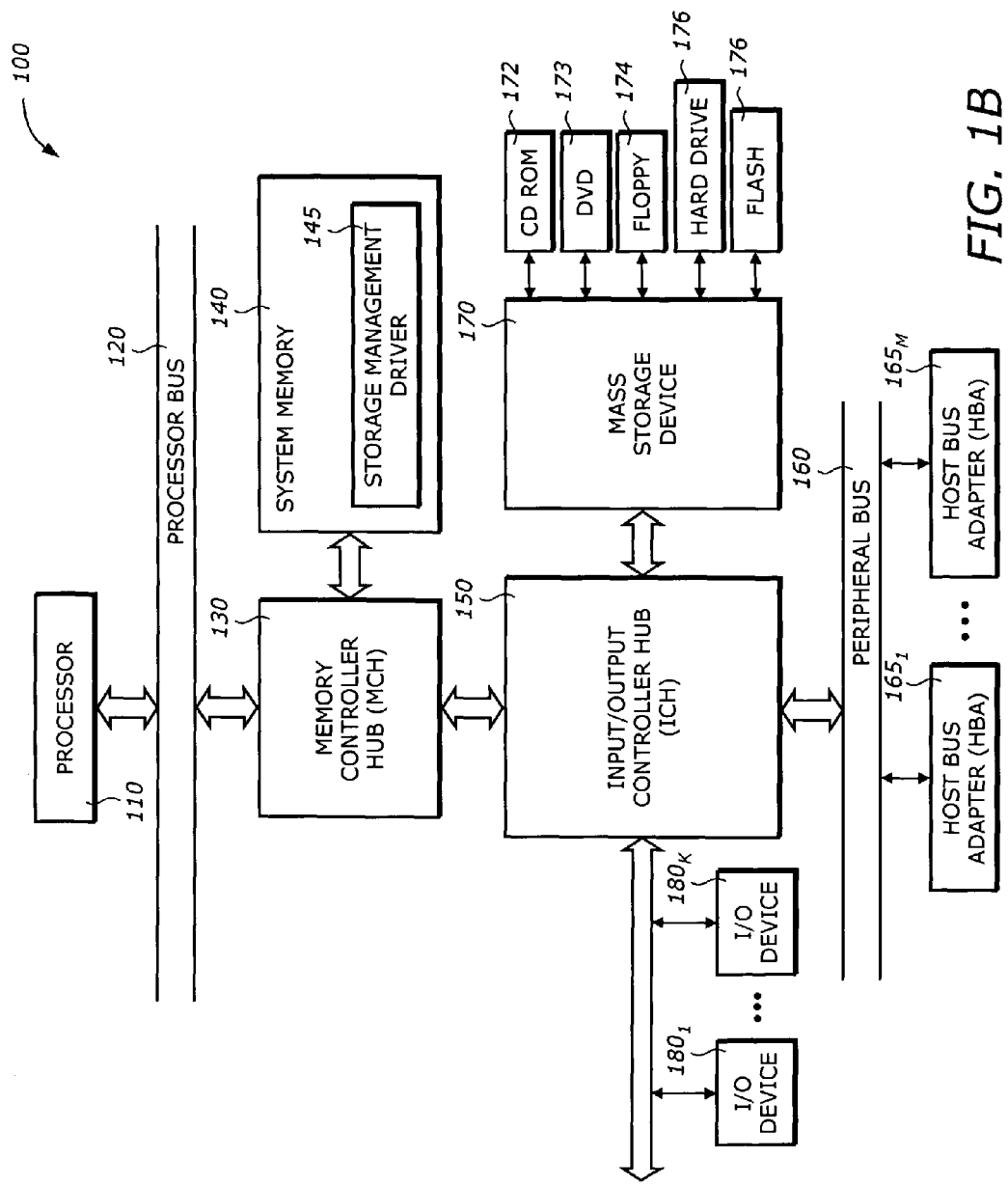
FIG. 1B is a diagram illustrating a server/client system according to one embodiment of the invention.

FIG. 1B is a diagram illustrating a server/client system 20 in which one embodiment of the invention can be practiced. The server/client system 20 includes a processor 110, a processor bus 120, a memory control hub (MCH) 130, a subsystem memory 140, an input/output control hub (ICH) 150, a peripheral bus 160, host bus adapters (HBAs) $165_1$ to $165_M$, a mass storage device 170, and input/output devices $180_1$ to $180_K$. Note that the server/client system 20 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140, the ICH 150. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. The system memory 140 includes a storage management driver 145. Any one of the elements of the storage management driver 145 may be implemented by hardware, software, firmware, microcode, or any combination thereof. The system memory 140 may also include other programs or data which are not shown, such as an operating system. The storage management driver 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The HBAs 1651 to 165M are adapters that interface to the switch 40 (FIG. 1A). The HBAs 1651 to 165M are typically add-on cards that interface to the peripheral bus 160 or any other bus accessible to the processor 110. The HBAs may have their own processor with local memory or frame buffer to store temporary data. The protocols supported by the HBAs may be Small Computer Small Interface (SCSI), Internet Protocol (IP), and Fiber Channel (FC). The transfer rates may be hundreds of MBps with full duplex. The media may include copper and multi-mode optics.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
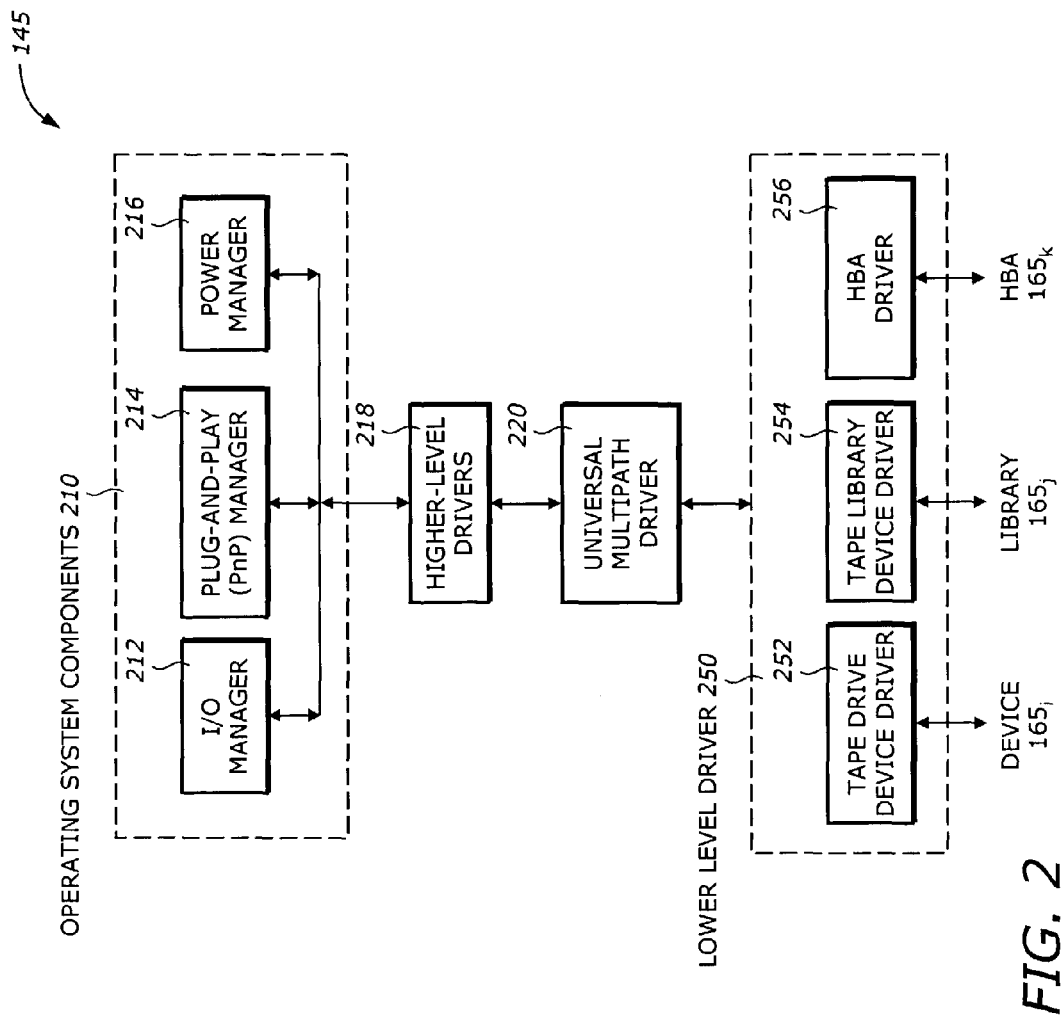
FIG. 2 is a diagram illustrating a storage management driver according to one embodiment of the invention.

FIG. 2 is a diagram illustrating the storage management driver 145 according to one embodiment of the invention. The storage management driver 145 includes operating system components 210, higher-level drivers 218, a universal multipath driver 220, and a lower level driver 250.

The OS components 210 include an I/O manager 212, a plug and play (PnP) manager 214, a power manager 216. The I/O manager 212 provides a consistent interface to all kernel-mode drivers. It defines a set of standard routines that other drivers can support. All I/O requests are from the I/O manager 212 sent as I/O request packets (IRPs). PnP manager 214 supports automatic installation and configuration of drivers when their corresponding devices are plugged into the system. The power manager 216 manages power usage of the system including power modes such as sleep, hibernation, or shutdown. The higher-level drivers 218 include a class driver and may also include any driver that interface directly to the OS components 210. In one embodiment, the I/O manager 212, the PnP manager 214, and the power manager 216 are from Microsoft Windows™ 2000, CE, and .NET.

The universal multipath driver (UMD) 220 is a driver that provides multipath management to the storage devices shown in FIG. 1B such as the tape drives, the tape library, and the disk subsystem. The UMD 220 responds to an IRP sent by the higher level driver 218 and interfaces to the lower level driver 250.

The lower level driver 250 includes drivers that are directly responsible for the control and management of the devices attached to the system. The lower level driver 250 includes a tape drive device driver 252, a tape library device driver 254, and a HBA driver 256 which are drivers for device $165_i$, library $165_j$, and HBA $165_k$, respectively. The HBA $165_k$ in turn directly controls the corresponding storage device(s)s shown in FIG. 1B.

Figure 3:
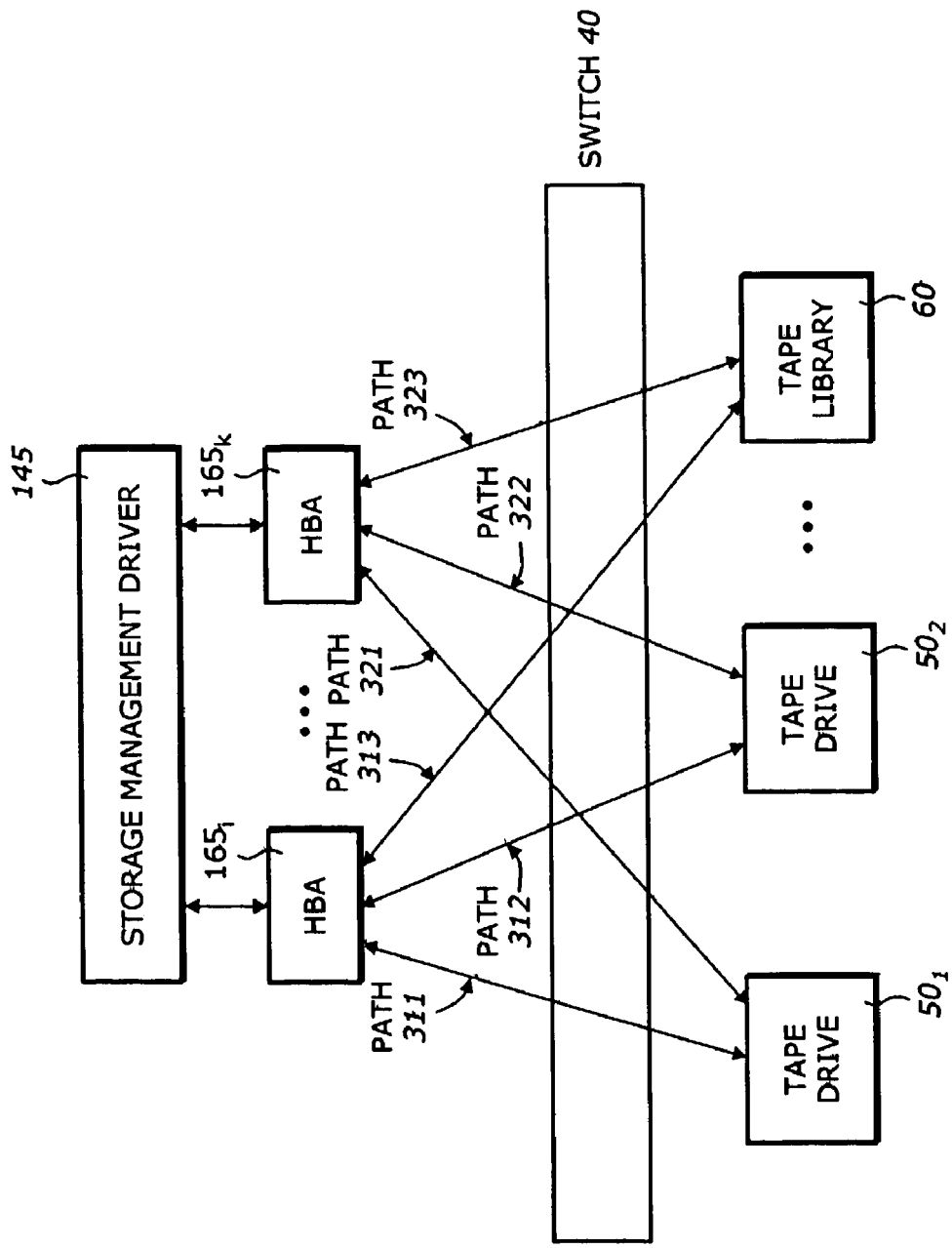
FIG. 3 is a diagram illustrating multipaths to physical devices according to one embodiment of the invention.

FIG. 3 is a diagram illustrating multipaths to physical devices according to one embodiment of the invention. A path is a physical connection between a HBA and the corresponding device. Typically, an HBA is interfaced to a number of devices via multiple paths through the switch 40. For example, the HBA $165_i$ is connected to the tape drives $50_1$ and $50_2$ and the tape library 60 through the paths 311, 312, and 313; and the HBA $165_k$ is connected to through the paths 321, 322, and 323, respectively.

The universal multipath driver (UMD) 220 provides multipath management, failover and fallback, and load balancing. This is accomplished by maintaining a list of devices attached to the system. The devices are identified by their device name, device identifier, and device serial number. This information is typically provided by the peripheral devices upon inquiry by the corresponding lower-level drivers.

Figure 4:
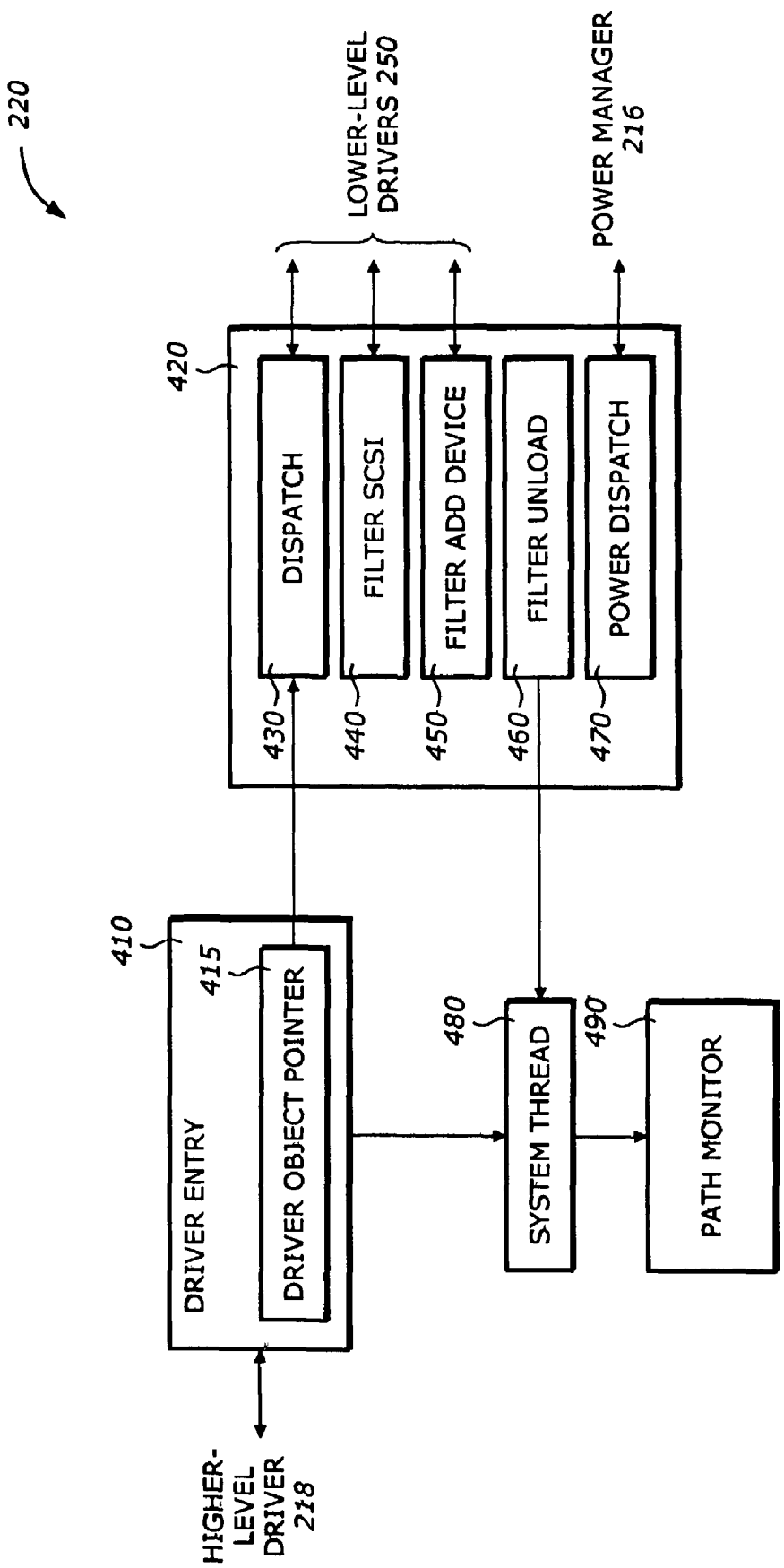
FIG. 4 is a diagram illustrating a universal multipath driver according to one embodiment of the invention.

FIG. 4 is a diagram illustrating the universal multipath driver (UMD) 220 according to one embodiment of the invention. The UMD 220 includes a driver entry 410, a major function group 420, a system thread 480, and a path monitor 490.

The driver entry 410 provides an entry point for the UMD 220 in response to an IRP issued by the higher level driver 218. The driver entry 410 includes a driver object pointer 415 that provides address reference or points to the major function group 420. The driver entry 410 also causes creation of the system thread 480. The system thread 480 invokes the path monitor 490.

The major function group 420 includes a number of functions, routines, or modules that manage the multiple paths connected to the physical devices. In one embodiment, these functions, modules, or routines are compatible with the Microsoft Developer Network (MSDN) library. The major function group 420 includes a dispatch function 430, a filter SCSI function 440, a filter add device function 450, a filter unload function 460, and a power dispatch function 470.

The dispatch function 430, the filter SCSI function 440, and the filter add device function 450 interface to the lower level driver 250. The dispatch function 430 dispatches the operations in response to receiving an IRP from the higher level driver 218. In one embodiment, the PnP manager sends a major PnP IRP request during enumeration, resource rebalancing, and any other time that plug-and-play activity occurs on the system. The filter SCSI function 440 sets up IRP's with device- or device-specific I/O control codes, requesting support from the lower-level drivers. The filter add device function 450 creates and initializes a new filter device object for the corresponding physical device object, then it attaches the device object to the device stack of the drivers for the device. The filter unload function 460 frees any objects and releases any driver-allocated resources. It terminates the system thread 480.

The path monitor 490 monitors the multiple paths in the system and determine if there is any fail-over. Path failover occurs when a peripheral device is no longer reachable via one of the paths. This may be a result of disconnection or any other malfunction or errors. When failover occurs, the failed path is placed into a bad path list. When a bad path becomes functional again, path failback can then be initiated. When failback is completed, the path is removed from the bad path list. When a failover is detected, an alternate path to an alternate device may be established for the failed device. The alternate device may be active or passive prior to the failover.

Figure 5:
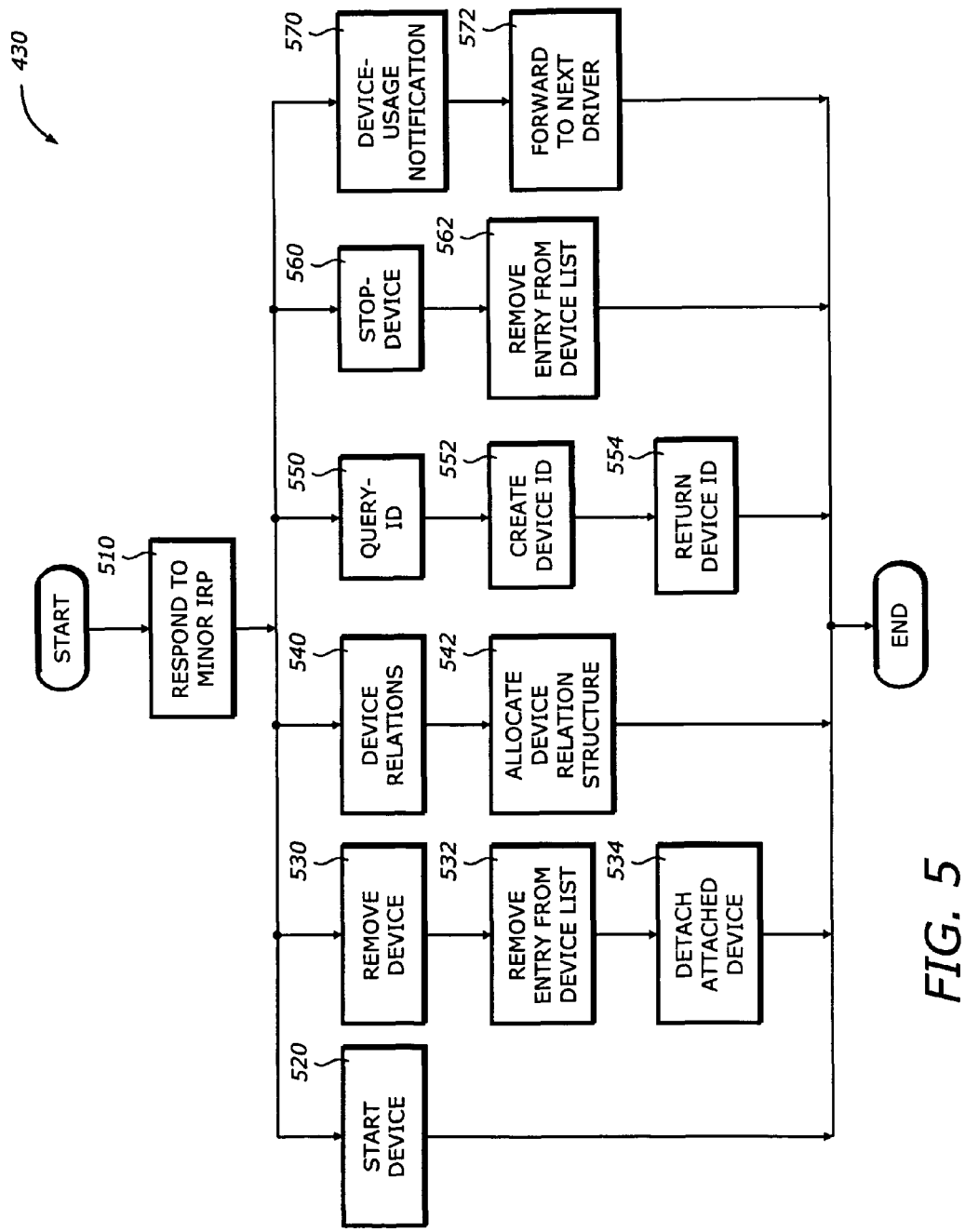
FIG. 5 is a flowchart illustrating a process to dispatch according to one embodiment of the invention.

FIG. 5 is a flowchart illustrating the process 430 to dispatch according to one embodiment of the invention.

Upon START, the process 430 responds to a minor IRP (Block 510). A minor IRP may be a start device minor IRP (Block 520), a remove device minor IRP (Block 530), a device relation minor IRP (Block 540), a query id minor IRP (Block 550), a stop device minor IRP (Block 560), and a device usage notification (Block 570). The process 430 performs operations in response to these minor IRPs accordingly.

Figure 6:
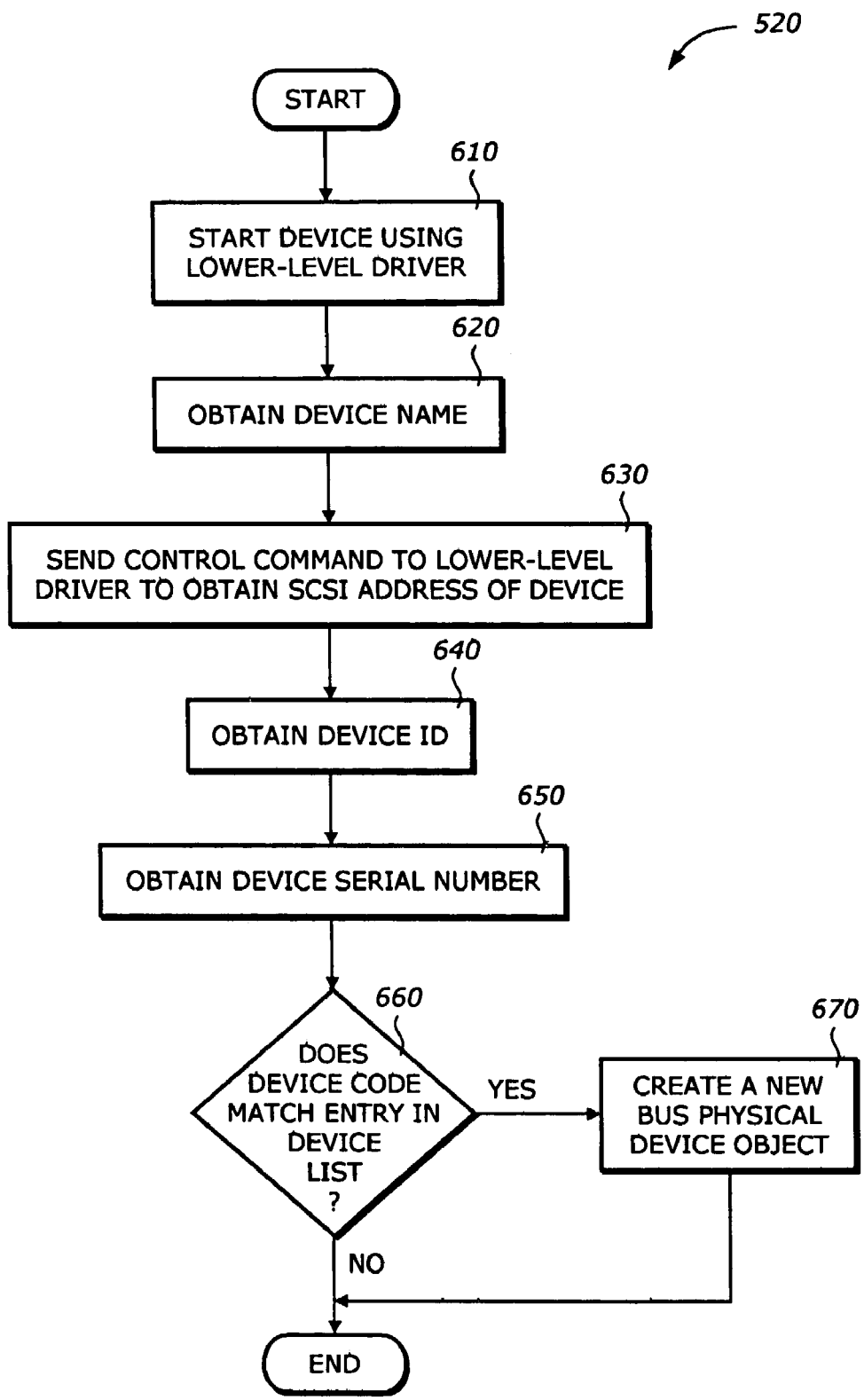
FIG. 6 is a flowchart illustrating a process to respond to a start device minor IRP according to one embodiment of the invention.

The details of operations for the start device minor IRP in Block 520 are shown in FIG. 6. In response to the remove device minor IRP, the process 430 removes an entry from a device list (Block 532). This entry contains the device attributes such as name, serial number, and device ID. Next, the process 430 detaches the attached device (Block 534). This can be performed by sending a command to the lower level driver that is responsible for controlling the attached device. The process 430 is then terminated.

In response to the device relations minor IRP, the process 430 allocates a device relation structure in a page memory (Block 542) and is then terminated. In response to the query id minor IRP, the process 430 creates a device ID (Block 552), returns the device ID (Block 554) and is then terminated. In response to the stop device minor IRP (Block 560), the process 430 removes an entry from the device list (Block 562) and is then terminated. In response to the device usage notification minor IRP (Block 570), the process 430 forwards the IRP to the next driver in the stack (Block 572) and is then terminated.

FIG. 6 is a flowchart illustrating the process 520 to respond to a start device minor IRP according to one embodiment of the invention.

Upon START, the process 520 starts the device using the lower level driver (Block 610). This may be performed by sending a command to the lower level driver that directly controls the device, or by writing control parameters to the appropriate calling function. Next, the process 520 obtains the device name (Block 620). Then, the process 520 sends control command to the lower level driver to obtain the SCSI address of the device (Block 630). Next, the process 520 obtains the device identifier (ID) (Block 640). Then, the process 520 obtains the device serial number (Block 650).

Next, the process 520 determines if the device code match an entry in the device list (Block 660). The device code may be any one of the device ID or the device serial number or both. If so, the process 520 creates a new bus physical device object (Block 670) and is then terminated. Otherwise, the process 520 is terminated.

Figure 7:
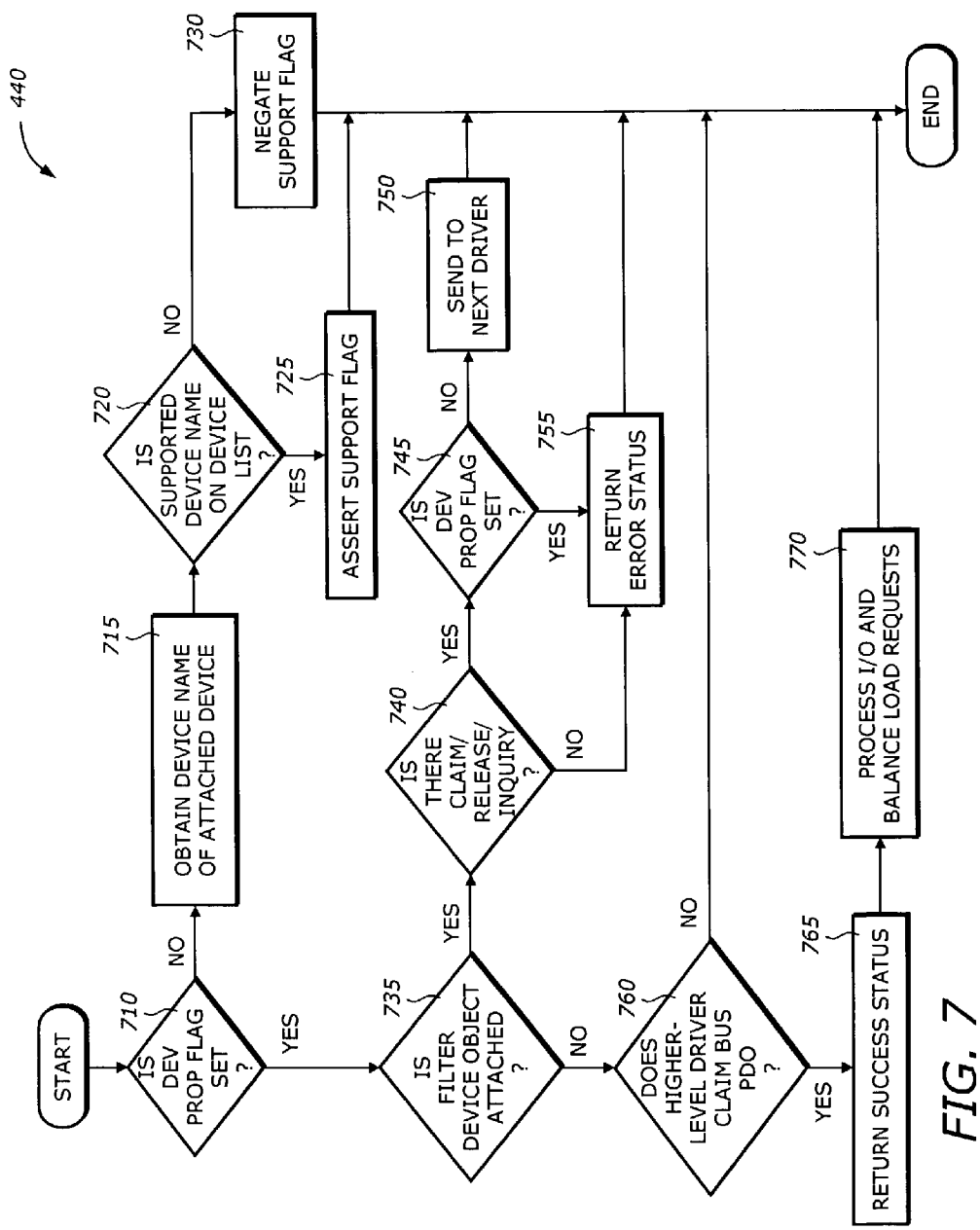
FIG. 7 is a flowchart illustrating a process to interface to lower level drivers according to one embodiment of the invention.

FIG. 7 is a flowchart illustrating the process 440 to interface to lower level drivers according to one embodiment of the invention.

Upon START, the process 440 determines if a device property flag indicating that the device property has been obtained is set (Block 710). If not, the process 440 obtains the supported device name of the attached device (Block 715). Then, the process 440 determines if the supported device name is on the device list (Block 720). If so, the process 440 asserts a device support flag and is then terminated. Otherwise, the process 440 negates the device support flag (Block 730) and is then terminated.

If the device property flags is not set, the process 440 determines if the filter device object is attached (Block 735). If so, the process 440 determines if there is a claim, release, or an inquiry (Block 740). If so, the process 440 determines if the device property flag is set (Block 745). Otherwise, the process 440 returns an error status (Block 755) and is then terminated. If there is not claim, release, or inquiry, the process 440 returns an error status (Block 755) and is then terminated. If the flag is not set in Block 745, the process 440 sends the request to the next driver (Block 750) and is then terminated.

If the filter device object is not attached, the process 440 determines if the higher level driver claim the bus physical device object (Block 760). If not, the process 440 is terminated. Otherwise, the process 440 returns a success status (Block 765). Then, the process 440 processes the I/O requests or balance the load (Block 770) and is then terminated. The details of the Block 770 are shown in FIG. 9.

Figure 8:
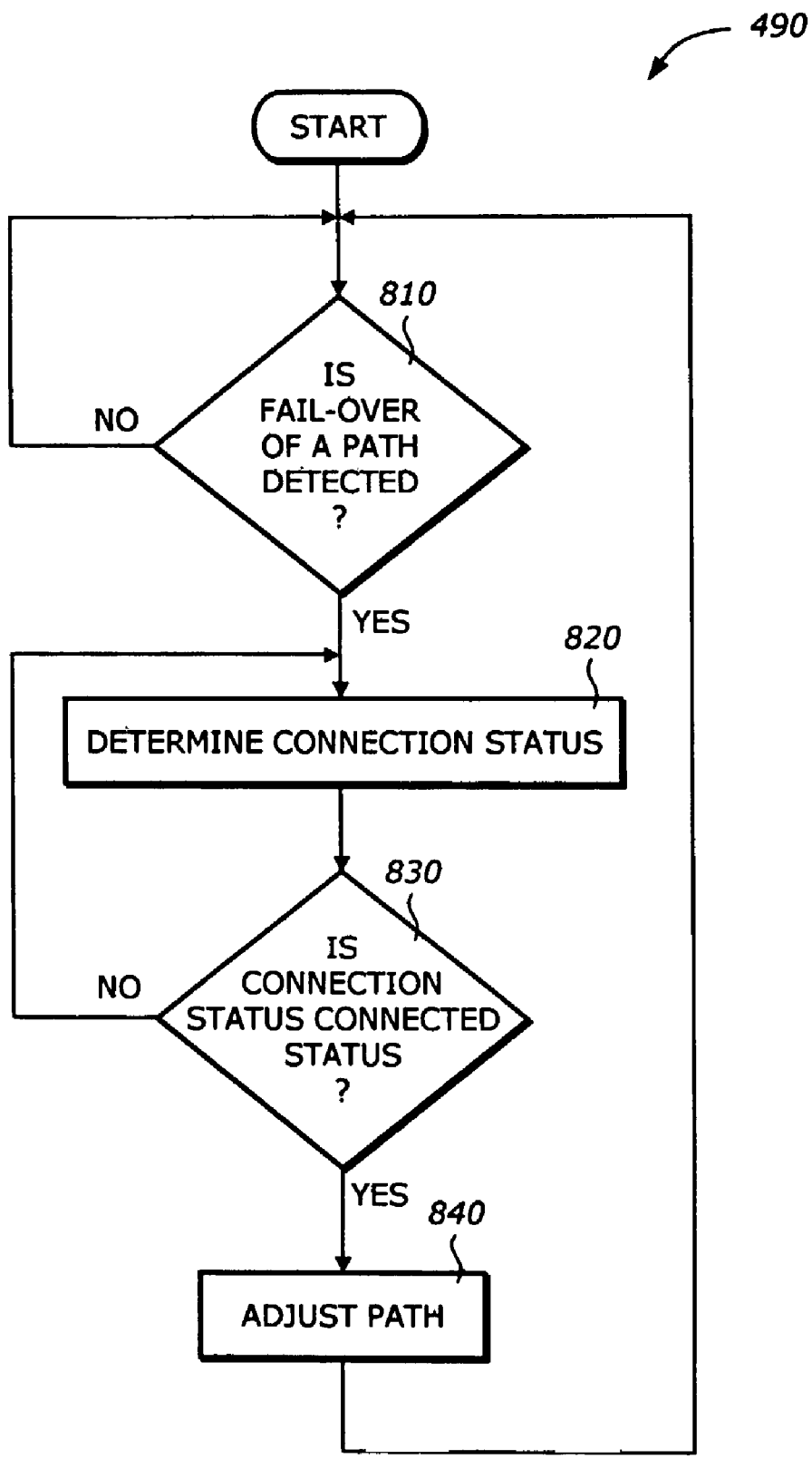
FIG. 8 is a flowchart illustrating a process to monitor paths according to another embodiment of the invention.

FIG. 8 is a flowchart illustrating the process 490 to monitor paths according to another embodiment of the invention.

Upon START, the process 490 determines if the failover of a path is detected (Block 810). The path corresponds to a first device in a plurality of devices having a plurality of device types. This can be performed by determining if the path is in a list of bad paths or paths having disconnected status, or if a first device name of the first device is in a list of disconnected devices. If not, the process 490 returns to Block 810 to continue polling the failover. Otherwise, when the failover is detected is process 490 determines the connection status of the path or the corresponding device (Block 820). This can be done by checking the status of the device as returned by the lower-level driver or the OS driver. This may be performed by sending a command to the first device. The command returns the connection status. When a failover is detected, an alternate path to an alternate device may be established for the failed device. The alternate device may be active or passive prior to the failover. Then, the process 490 determines if the connection status is a connected status (Block 830). A connected status indicates that the device is back on line. If not, the process 490 returns to Block 820 to continue determining the connection status. Otherwise, the process 490 adjusts the path (Block 840). This may be performed by removing the first device name from the first list if the returned connection status is a connected status. Additionally, the process 490 may establish the path to the first device or suspend access to the first device. The process 490 is then terminated.

Figure 9:
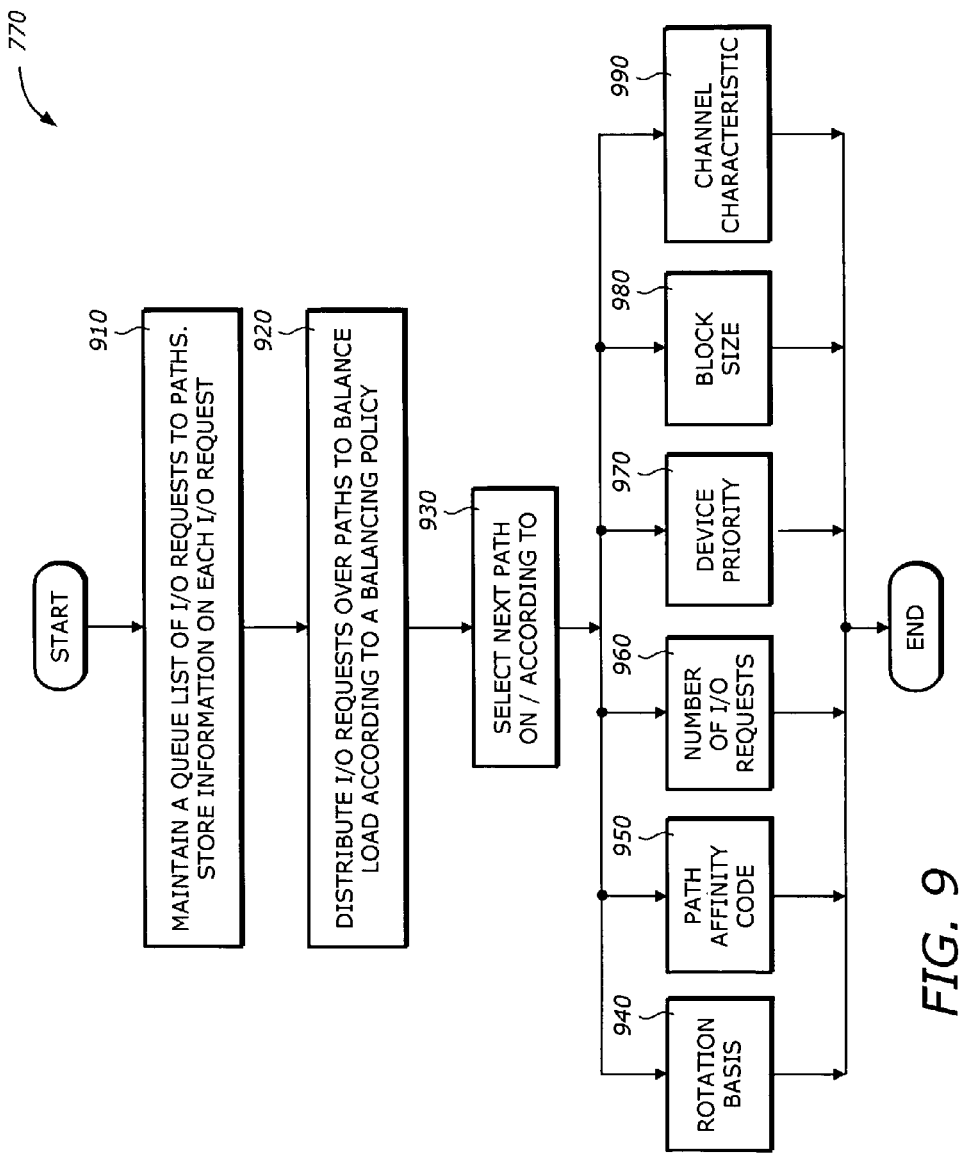
FIG. 9 is a flowchart illustrating a process to balance load according to one embodiment of the invention.

FIG. 9 is a flowchart illustrating the process 770 to balance load according to one embodiment of the invention.

Upon START, the process 770 maintains a queue list of I/O requests to the paths (Block 910). This can be done by storing information on each of the I/O requests in the queue list. The information may include a pointer or an address reference to the device object, a device priority, a path affinity code, a number of I/O requests for a path, or a channel characteristic. The channel characteristic may includes the channel speed or transfer rate, the channel capacity, etc. Then, the process 770 distributes the I/O requests over the paths to balance the load according to a balancing policy (Block 920). This can be done by selecting a next path in the queue list (Block 930) using a balancing criteria. A number of balancing criteria or policies can be used.

In a round robin policy, the process 770 selects the next path on a rotation basis (Block 940). This can be performed by moving the head of a queue back to the end and advance the queued requests up by one position. In a path affinity policy, the process 770 selects the next path according to the path affinity code (Block 950). The path affinity code indicates a degree of affinity of the next path with respect to the current path. In a request policy, the process 770 selects the next path according to the number of I/O requests assigned to that path (Block 960). Typically, the path having the least amount of I/O requests is selected. In a priority policy, the process 770 selects the next path according to the device priority (Block 970). The device priority may be determined in advance during initialization or configuration, or may be dynamically determined based on the nature of the I/O tasks. In a size policy, the process 770 selects the next path according to the block size of the I/O requests (Block 980). Typically, the path having the largest block size is selected. In a channel policy, the process 770 selects the next path according to the channel characteristic (Block 990). For example, the path having a channel with fast transfer rate may be selected.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    detecting a failover of a first path connecting an adapter to a first device in a plurality of physical devices having a plurality of device types, the adapter being controlled by a low level driver that interfaces to a universal multipath driver (UMD), the plurality of the physical devices being attached to a server;
    determining a connection status of the first device if the failover is detected, the connection status being one of a connected status and a disconnected status, the disconnected status corresponding to the failover; and
    adjusting the first path according to the connection status.

2. The method of claim 1 wherein detecting comprises:
    determining if a first device name of the first device is in a list of disconnected devices.

3. The method of claim 1 wherein determining the connection status comprises:
    sending a command to the first device, the command returning the connection status.

4. The method of claim 3 wherein adjusting the first path comprises:
    removing the first device name from the first list if the returned connection status is the connected status.

5. The method of claim 1 further comprising:
    establishing an alternate path connecting the adapter to an alternate device for the first device when the failover is detected, the alternate device being active prior to the failover.

6. The method of claim 1 further comprising:
    establishing an alternate path connecting the adapter to an alternate device for the first device when the failover is detected, the alternate device being passive prior to the failover.

7. The method of claim 1 further comprising:
    establishing the first path to the first device when the connection status is the connected status after the failover is detected.

8. The method of claim 1 wherein detecting the failover comprises:
    detecting the failover of the first path corresponding to the first device in a plurality of physical devices having a plurality of different device types, the plurality of device types including at least two of a disk device, a tape device, a redundant array of inexpensive disks (RAID) subsystem, and a tape library.

9. The method of claim 1 further comprising:
    suspending access to the first device if the failover is detected.

10. The method of claim 6 further comprising:
    resuming access to the first device when the connection status is the connected status after the failover is detected.

11. A non-transitory computer readable storage media containing non-transitory encoded data that when accessed by a machine instructs the machine to perform a computer implemented method, the method comprising:
    a non-transitory machine-accessible medium including data that, when accessed by a machine, causes the machine to perform operations comprising:
    detecting a failover of a first path connecting an adapter to a first device in a plurality of physical devices having a plurality of device types, the adapter being controlled by a low level driver that interfaces to a universal multipath driver (UMD), the plurality of the physical devices being attached to a server;
    determining a connection status of the first device if the failover is detected, the connection status being one of a connected status and a disconnected status, the disconnected status corresponding to the failover; and adjusting the first path according to the connection status.

12. The non-transitory computer readable storage media of claim 11 wherein detecting comprises data that, when accessed by a machine, causes the machine to perform operations comprising: determining if a first device name of the first device is in a list of disconnected devices.

13. The non-transitory computer readable storage media of claim 11 wherein determining the connection status comprises data that, when accessed by a machine, causes the machine to perform operations comprising: sending a command to the first device, the command returning the connection status.

14. Non-transitory computer readable storage media of claim 13 wherein adjusting the first path comprises data that, when accessed by a machine, causes the machine to perform operations comprising: removing the first device name from the first list if the returned connection status is the connected status.

15. The non-transitory computer readable storage media of claim 11 further comprising data that, when accessed by a machine, causes the machine to perform operations comprising: establishing an alternate path connecting the adapter to an alternate device for the first device when the failover is detected, the alternate device being active prior to the failover.

16. The non-transitory computer readable storage media of claim 11 further comprising data that, when accessed by a machine, causes the machine to perform operations comprising: establishing an alternate path connecting the adapter to an alternate device for the first device when the failover is detected, the alternate device being passive prior to the failover.

17. The non-transitory computer readable storage media of claim 11 further comprising data that, when accessed by a machine, causes the machine to perform operations comprising: establishing the first path to the first device when the connection status is the connected status after the failover is detected.

18. The non-transitory computer readable storage media of claim 11 wherein detecting the failover comprises data that, when accessed by a machine, causes the machine to perform operations comprising: detecting the failover of the first path corresponding to the first device in a plurality of physical devices having a plurality of different device types, the plurality of device types including at least two of a disk device, a tape device, a redundant array of inexpensive disks (RAID) subsystem, and a tape library.

19. The non-transitory computer readable storage media of claim 11 further comprising data that, when accessed by a machine, causes the machine to perform operations comprising: suspending access to the first device if the failover is detected.

20. The non-transitory computer readable storage media of claim 16 further comprising data that, when accessed by a machine, causes the machine to perform operations comprising: resuming access to the first device when the connection status is the connected status after the failover is detected.

21. A system comprising:
a processor;
a plurality of devices having a plurality of device types coupled to the processor via a plurality of adapters; and
a memory coupled to the processor, the memory containing program code that, when executed by the processor, causes the processor to:
detect a failover of a first path connecting one of the adapters to a first device in a plurality of physical devices having a plurality of device types, the one of the adapters being controlled by a low level driver that interfaces to a universal multipath driver (UMD),
determine a connection status of the first device if the failover is detected, the connection status being one of a connected status and a disconnected status, the disconnected status corresponding to the failover, and
adjust the first path according to the connection status.

22. The system of claim 21 wherein the program code causing the processor to detect comprises program code that, when executed by the processor, causes the processor to:
determine if a first device name of the first device is in a list of disconnected devices.

23. The system of claim 21 wherein the program code causing the processor to determine the connection status comprises program code that, when executed by the processor, causes the processor to:
send a command to the first device, the command returning the connection status.

24. The system of claim 23 wherein the program code causing the processor to adjust the first path comprises program code that, when executed by the processor, causes the processor to:
remove the first device name from the first list if the returned connection status is the connected status.

25. The system of claim 21 wherein the program code further comprises program code that, when executed by the processor, causes the processor to:
establish an alternate path connecting the one of the adapters to an alternate device for the first device when the failover is detected, the alternate device being active prior to the failover.

26. The system of claim 21 wherein the program code further comprises program code that, when executed by the processor, causes the processor to:
establish an alternate path connecting the one of the adapters to an alternate device for the first device when the failover is detected, the alternate device being passive prior to the failover.

27. The system of claim 21 wherein the program code further comprises program code that, when executed by the processor, causes the processor to:
establish the first path to the first device when the connection status is the connected status after the failover is detected.

28. The system of claim 21 wherein the program code causing the processor to detect the failover comprises program code that, when executed by the processor, causes the processor to:
detect the failover of the first path corresponding to the first device in a plurality of physical devices having a plurality of different device types, the plurality of device types including at least two of a disk device, a tape device, a redundant array of inexpensive disks (RAID) subsystem, and a tape library.

29. The system of claim 21 wherein the program code further comprises program code that, when executed by the processor, causes the processor to:
suspend access to the first device if the failover is detected.

30. The system of claim 26 wherein the program code further comprises program code that, when executed by the processor, causes the processor to:
resume access to the first device when the connection status is the connected status after the failover is detected.

* * * * *